(12) United States Patent
Lenti et al.

(10) Patent No.: US 6,461,998 B2
(45) Date of Patent: Oct. 8, 2002

(54) LUBRICANT COMPOSITIONS BASED ON PTFE

(75) Inventors: Daria Lenti, Alessandria; Gabriella Carignano, Milan, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/805,556

(22) Filed: Mar. 14, 2001

(65) Prior Publication Data

US 2001/0031709 A1 Oct. 18, 2001

(30) Foreign Application Priority Data

Mar. 14, 2000 (IT) .......................... MI00A0505

(51) Int. Cl.$^7$ .................... C10M 105/54; C10M 107/38
(52) U.S. Cl. ........................................ 508/182; 508/582
(58) Field of Search .................. 508/182, 582

(56) References Cited

U.S. PATENT DOCUMENTS

| | | | |
|---|---|---|---|
| 2,242,218 A | 5/1941 | Auer | 427/316 |
| 3,665,041 A | 5/1972 | Sianesi et al. | 568/601 |
| 3,715,378 A | 2/1973 | Sianesi et al. | 558/283 |
| 4,675,380 A | 6/1987 | Buckmaster et al. | 528/481 |
| 4,864,006 A | 9/1989 | Giannetti et al. | 526/209 |
| 4,906,770 A | 3/1990 | Marchionni et al. | 560/300 |
| 5,154,845 A * | 10/1992 | Williams | 508/182 |
| 5,294,248 A | 3/1994 | Chittofrati et al. | 106/10 |
| 5,532,310 A * | 7/1996 | Grenfell et al. | 524/463 |
| 6,025,307 A * | 2/2000 | Chittofrati et al. | 508/182 |

FOREIGN PATENT DOCUMENTS

| | | |
|---|---|---|
| EP | 0 075 312 A2 | 3/1983 |
| EP | 0 148 482 A2 | 7/1985 |
| EP | 0 247 379 A1 | 12/1987 |
| EP | 0 633 274 B1 | 1/1995 |
| EP | 0 687 533 A1 | 12/1995 |
| EP | 0 709 517 A1 | 5/1996 |
| EP | 0 818 489 A2 | 1/1998 |
| EP | 0 818 490 A2 | 1/1998 |
| EP | 0 826 714 A2 | 3/1998 |
| EP | 0 866 114 A2 | 9/1998 |
| EP | 0 894 830 A2 | 2/1999 |
| EP | 0 894 838 A2 | 2/1999 |
| GB | 1104482 | 2/1968 |
| GB | 1226566 | 3/1971 |

OTHER PUBLICATIONS

Patent Abstracts of Japan, vol. 017, No. 551, Oct. 5, 1993 & JP 05 156029 A.
Database WPI, Section Ch, Week 199329, Derwent Publications Ltd., London, GB, AN 1993.

* cited by examiner

*Primary Examiner*—Ellen M. McAvoy
(74) *Attorney, Agent, or Firm*—Arent Fox Kintner Plotkin & Kahn

(57) ABSTRACT

Use as lubricants having a low friction coefficient and an improved noise reduction among moving mechanical parts of dispersions comprising a fluorinated oil and a (per) fluoropolymer, said compositions dilutable with water and obtainable by mixing:
a) a fluorinated oil having a (per)fluoropolyether structure,
b) a concentrated aqueous dispersion of a (per) fluoropolymer (component b'), stabilized by a non ionic and non fluorinated surfactant,
c) a fluorinated and/or hydrogenated surfactant,
d) water.

28 Claims, No Drawings

LUBRICANT COMPOSITIONS BASED ON PTFE

The present invention relates to the use as lubricants having a low friction coefficient and an improved noise reduction among moving mechanical parts, preferably mechanical parts in polymer material, of concentrated dispersions dilutable with water.

More specifically the present invention relates to concentrated dispersions dilutable with water comprising a lubricant having a (per)fluoropolyether structure, a (per) fluoropolymer, water, a surfactant and optionally a fluorinated solvent, and to the above dispersions when they are used for the above application. Said dispersions can be used, even in very thin layers, for the lubrication for example of miniaturized gears, flat surfaces both in plastomer and metal material, surfaces in plastic material in contact with painted surfaces, seal gaskets, moulds for moulding plastomer and elastomer materials, lubrication of hinges in plastic or metal material.

The concentrated dispersions in order to be applied in a thin layer require a dilution with water: the usable dispersions according to the invention must therefore be dilutable with water and therefore they must be continuous in water. The non dilution with water would lead to biphasic systems unsuitable to give continuous liquid layers on the substrata to be lubricated.

The treatment of surfaces and articles with dispersions of PTFE as dry lubricant is known in the prior art, applying said dispersions and evaporating the solvent, leaving as a result an uniform layer of PTFE at a dry state. Dispersions in water or in organic solvents (for example isopropanol), for example Vydax®, are marketed; they contain PTFE having a low molecular weight at a concentration in the range 20–30% by weight. These dispersions in order to be used must be diluted at about 2% of dry product. A solvent used for this purpose was CFC 113 for its high volatility. However it is well known that CFCs cannot be used any longer according to the Montreal Protocol due to their environmental impact.

A partial solution to these drawbacks has been obtained by adding to said dispersions hydrochlorofluorocarbons (HCFC), such as for example 141b, alone or in combination with (per)fluorocarbons. This solution, as said, is partial since also HCFCs are subjected to restrictions according to the Montreal Protocol and later amendments due to their impact on the atmospheric ozone. A solution to this problem has been suggested in U.S. Pat. No. 5,532,310, which relates to dispersions of fluoropolymers in (per)fluorinated liquids, wherein the (per)fluorinated liquids are included in the continuous phase. The dispersions have sufficient stability to be used for preparing coatings. This patent relates also to the preparation of emulsions of (per)fluorinated liquids and polar solvents. The dispersions of the patent are formed by four main components: a (per)fluorinated solvent, a polar solvent (including water and polar organic solvents), a (per)fluoropolymer under the form of dispersed particles, typically PTFE, and a surfactant selected from specific classes. Typically the system comprises as main component the (per)fluorinated solvent. The teaching of this patent relates to the preparation of a (per)fluoropolymer coating such as for example PTFE to be used as dry lubricant, starting from an emulsion of fluorinated solvents and polar hydrogenated solvents or water.

The drawback of the PTFE-based dispersions used as dry lubricant resides in that the lubricant properties are not very high since the friction coefficient is rather high and there is not a meaningful noise reduction.

The use of greases formed by mixtures of PTFE and (per)fluoropolyether (PFPE) oils as lubricants for bearings, sliding surfaces, etc. is also known in the prior art. These greases are viscous systems and are not substantially suitable to be used as lubricants in thin films.

It is known that dispersions of fluorinated PFPE oils in water have low stablity. It has been recently found by the Applicant, see EP 894,838, that dispersions having improved stability to separation during the time, comprising (per)fluorinated solvents and (per)fluorinated polymers, specifically PTFE, can be prepared by mixing a fluoropolymer in polar solvent water and/or alcohol, with a fluorinated liquid having a (per)fluoropolyether or (per)fluorocarbon structure, in the presence of specific surfactants. The dispersions comprise from 0.1 to 30% by weight of PTFE, 50–99% by weight of fluorinated liquid, from 0.01 to 5% by weight of a surfactant selected from particular classes and polar solvent complement to 100% by weight. The fluorinated liquids are (per)fluoropolyethers having a number average molecular weight 250–5,000, preferably 350–1,000, or liquid (per)fluorocarbons or mixtures thereof. These dispersions can be obtained in various ways and using various starting components. The preparation of the dispersions can be carried out by a process comprising the following steps. One starts from dispersions of fluorinated polymers in polar solvent water and/or alcohol (step a')), surfactants are added (step b')) and subsequently a (per)fluoropolyether or (per) fluorocarbon liquid such that the ratio by weight polymer/ (per)fluorinated liquid is lower than 0.7 (step c')). The (per)fluoropolymer dispersions in polar solvent used in a') are the (per)fluoropolymer dispersions in alcohol or the latexes directly obtained from polymerization processes using water. The concentration of (per)fluorinated polymers in the latexes ranges from 20 to 50% by weight. Said latexes can optionally be concentrated up to 60–75% by weight of (per)fluoropolymer. The (per)fluoropolymer/polar solvent system of step b') is obtained by a gelification process of the aqueous latexes of step a'), neutralization and dispersion of the gel. In the gelification process high yields of transfer of the PTFE polymer from the polar solvent to the fluorinated organic phase, are obtained. In most Examples wherein the gel formation process is used, a PTFE dispersion in the fluorinated organic liquid containing a very low amount of water, of the order of some percent by weight, for example 2–7%, is therefore obtained. In the Examples wherein the gelification process is not used but a simple mixing of the phases, i.e. by directly using the initial dispersion of the (per)fluoropolymer, a biphasic system can be obtained consisting of a (per)fluoropolymer dispersion in fluorinated solvent having a very low water content, lower than about 20% by weight, and of an aqueous phase which substantially comprises most part of the (per)fluoropolymer and the surfactant, wherein the fluorinated solvent is practically absent.

In the Examples in which the (per)fluoropolymer is used under the form of concentrated latex, stabilized by non ionic surfactants such as for example Triton® X100, the system obtained by the process is formed by a mixture comprising water in a percentage in the range 10–20% by weight and (per)fluoropolymer in the range 15–25% by weight. The remaining part of the mixture is formed by (per) fluoropolyether solvents. In the reported application Example (Example 21) a coating formed by a continuous polymer film of (per)fluoropolymer is described, obtained from this dispersion through the complete evaporation of all the solvents (water and fluorinated solvents).

From the prior art no indication is available about the preparation of aqueous dispersions of (per)fluoropolyether lubricants dilutable with water to give a continuous phase and especially of dispersions able to give lubricant films having a low friction coefficient and an improved noise reduction among moving mechanical parts, preferably mechanical parts in polymer material.

The need was felt to have available stable dispersions of fluorinated oils in aqueous medium in order to minimize the environmental impact of solvents and to improve the performances of the applications of lubricant having the combination of the indicated properties in thin films for the lubrication for example of miniaturized gears, flat surfaces both in plastomer and metal material, surfaces in plastic material in contact with painted surfaces, seal gaskets, moulds for moulding plastomer and elastomer materials, lubrication of hinges in plastic or metal material.

It has now been unexpectedly and surprisingly found that said technical problem can be solved by using dispersions as specified hereinafter.

An object of the present invention are dispersions, and their use as lubricants having a low friction coefficient and an improved reduction of the noise among moving mechanical parts, preferably mechanical parts in polymer material, said dispersions comprising a fluorinated oil, a perfluoropolymer and water, said compositions dilutable with water even up to a concentration of 1% by weight of fluorinated oil+(per)fluoropolymer, obtainable by mixing:

a) a fluorinated oil having a (per)fluoropolyether structure having lubricant capability, having a number average molecular weight higher than 1,300, preferably higher than 1,400, b) a concentrated aqueous dispersion of a (per)fluoropolymer (component b'), stabilized by a non ionic and non fluorinated surfactant, wherein the (per)fluoropolymer concentration is in the range 40–75% by wheight, c) a fluorinated and/or hydrogenated surfactant, d) water, e) optionally a fluorinated solvent having no lubricant properties, low boiling and having a number average molecular weight lower than 1,000, eliminating the aqueous supernatant layer if after mixing the system separates in two phases.

It has been unexpectedly found by the Applicant that the compositions of the invention diluted with water up to the indicated values, remain stable for at least 30 minutes, or even for some hours. The fact that no separation takes place allows to obtain uniform and continuous coatings with improved friction properties.

The ratio by weight lubricant oil component a)/(per)fluoropolymer component b') is in the range 0.5–8, preferably 1.5–3.5. The optional fluorinated solvent component e) is not considered since in order to form the final lubricant coating both water and low-boiling solvents are completely removed in order to avoid that the lubricant properties of the coating are compromised. Generally water and low-boiling solvents are removed by heating at 60°–90° C., preferably 60°–80° C., at the pressure of 1 atm for the time necessary for this operation.

The compositions which are used in the application of the present invention are able to form a lubricant, even very thin film of the order of one hundred micron, with very good lubricant properties and good dimensional stability.

Without to be bound to any theory, the Applicant deems that the lubricant effect of the compositions used in the present invention is due to the (per)fluoropolyether in combination with the thickening effect of the (per)fluoropolymer, which behaves as support for the PFPE film.

The dispersions of the present invention can be used, preferably after dilution, for example for the lubrication of miniaturized gears, both in plastic material and in metal, for the lubrication of flat surfaces both in plastomer and metal material, and of surfaces of plastic material in contact with painted surfaces, for the lubrication of seal gaskets and of moulds for moulding plastomer and elastomer materials, for the lubrication of hinges in plastic or metal material.

The dispersions of the invention preferably comprise the amounts of the following components (by weight):

a) (per)fluoropolyether oil: 25–70%, b') (per)fluoropolymer: 5–40%, c) fluorinated and/or hydrogenated, i.e. non fluorinated, surfactant: 0.01–5%; the non fluorinated surfactant can derive from the dispersion b) of the (per)fluoropolymer; in said dispersion the amount of the non fluorinated surfactant is comprised between 5–8% by weight based on the (per)fluoropolymer (component b')) amount, d) water: complement to 100% but not lower than about 10%, generally in the range 10–30%, e) optionally a (per)fluorinated solvent having a (per)fluoropolyether or (per)fluorocarbon structure: 0–30%, the ratio oil/(per)fluoropolymer being that above indicated.

The dispersions of the invention could be used as such, without dilution with water, but with the above indicated drawbacks.

The dilution ratio with water depends on the type of application and on the required lubricant thickness, taking into account that higher the concentrations of dry product in the dispersion higher the thickness of the obtained lubricant film. Preferably the dispersions are diluted with water so that the water amount is higher than 30% by weight, more preferably higher than 40%, still more preferably higher than 50–60% by weight.

The (per)fluoropolyether lubricant component a) has preferably perfluorinated end groups. The number average molecular weight is in the range 1,300–40,000, generally the kinematic lubricant viscosity, measured at 20° C., is in the range 30–1,800 cSt (3–180·10$^7$ m$^2$/s) With (per)fluoropolyether lubricant, compounds comprising fluorooxyalkylene units preferably selected from the following: ($CF_2CF_2O$), ($CF_2O$), ($CF_2CF(CF_3)O$), ($CF(CF_3)O$), ($CF_2CF_2CF_2O$), are meant, said units being statistically distributed along the polymer chain. For example (per)fluoropolyethers of non reactive type, i.e. having (per)fluoroalkyl end groups, selected from the following classes, can be used:

($a_1$) $T_1$—O($CF_2$—CF($CF_3$)O)$_a$(CFXO)$_b$—$T_2$ wherein:

$T_1$ and $T_2$, equal to or different from each other, can be —$CF_3$, —$C_2F_5$, —$C_3F_7$ groups, X is —F or —$CF_3$; a, b are numbers such that the molecular weight is within the above indicated range.

These perfluoropolyethers are obtained according to the process described in UK 1,104,482, with subsequent conversion of the end groups into non reactive groups according to the process described in UK 1,226,566.

($b_1$) $CF_3$—O($CF_2CF_2O$)$_c$($CF_2O$)$_d$—$CF_3$ wherein:

c, d are integers such that the molecular weight is within the above indicated range.

These PFPEs are prepared by photochemical oxidation of $C_2F_4$ according to U.S. Pat. No. 3,715,378.

($c_1$) 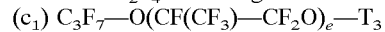$C_3F_7$—O(CF($CF_3$)—$CF_2O$)$_e$—$T_3$ wherein:

$T_3$ can be —$C_2F_5$, —$C_3F_7$; e is an integer such that the molecular weight is within the above indicated range;

These compounds are prepared by ionic oligomerization of the hexafluoropropene epoxide and subsequent treatment of the acyl fluoride (COF) with fluorine according to U.S. Pat. No. 2,242,218.

(d$_1$) T$_4$—O(CF$_2$—CF(CF$_3$)O)$_g$(C$_2$F$_4$O)$_h$(CFXO)$_i$—T$_5$ wherein:

T$_4$ and T$_5$, equal to or different from each other, are perfluorinated groups —CF$_3$, —C$_2$F$_5$, —C$_3$F$_7$; X is —F or —CF$_3$;

g, h, i, are integers such that the molecular weight is within the above indicated range.

These products are obtained by photooxidation of mixtures of C$_3$F$_6$ and C$_2$F$_4$ and subsequent treatment with fluorine according to the process described in U.S. Pat. No. 3,665,041.

(e$_1$) T$_6$—O(CF$_2$CF$_2$CF$_2$O)$_l$—T$_7$ wherein:

T$_6$ and T$_7$, equal to or differnt from each other, are —CF$_3$, —C$_2$F$_5$, —C$_3$F$_7$ groups; l is an integer such that the molecular weight is within the above indicated range.

These products are obtained according to EP 148,482.

The preferred perfluoropolyethers are those of the (a$_1$), (b$_1$) and (d$_1$) classes.

The (per)fluoropolyether end groups are of fluoroalkyl type, optionally containing one chlorine and/or H atom, for example: —CF$_3$, —C$_2$F$_5$, —C$_3$F$_7$.

The viscosity of the lubricant perfluoropolyether oil must be selected on the basis of the requirements of the application system.

The (per)fluoropolymer component b') is preferably under the form of concentrated latex stabilized by a non ionic surfactant. The latex concentration is preferably in the range 50–75% by weight. As (per)fluoropolymers, TFE homopolymers or tetrafluoroethylene copolymers can be mentioned. Among the latter it can be mentioned, for example:

A) modified polytetrafluoroethylene containing small amounts, generally in the range 0.01–3% by moles, preferably 0.05%-0,5% by moles, of one or more comonomers selected from perfluoroalkylperfluorovinylethers, such as for example methylvinylether and propylvinylether; vinylidene fluoride; hexafluoroisobutene; chlorotrifluoroethylene; perfluoroalkylethylenes, such as for example perfluoropropene;

B) thermoplastic copolymers of tetrafluoroethylene (TFE) containing from 0.5 to 8% by moles of at least one perfluoroalkylvinylether, wherein the perfluoroalkyl radical has from 1 to 6 carbon atoms, such as for example, the TFE/perfluoropropylvinylether, TFE/perfluoromethylvinylether, TFE/perfluoroethylvinylether, TFE/perfluoroalkylethylene copolymers;

C) thermoplastic copolymers of tetrafluoroethylene containing from 2 to 20% by moles of a C$_3$-C$_8$ perfluoroolefin, such as, for example, the TFE/hexafluoropropene copolymer, to which small amounts (lower than 5% by moles) of other comonomers having a perfluorovinylether structure can be added (as described, for example, in U.S. Pat. No. 4,675,380);

D) thermoplastic copolymers of tetrafluoroethylene containing from 0.5 to 13% by weight of perfluoromethylvinylether and from 0.05 to 5% by weight of one or more fluorinated monomers selected from the group formed by:

1) R$_F$O—CF=CF$_2$ (II)

wherein R$_F$ can be:

i) a perfluoroalkyl radical containing from 2 to 12 carbon atoms;

ii)

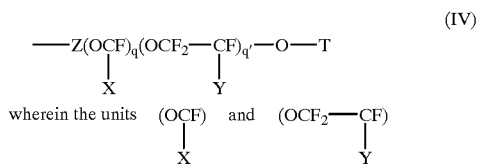

wherein r is an integer in the range 1–4 and r' is an integer in the range 0–3;

iii)

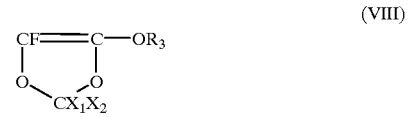

are statistically distributed along the chain; T is a (per)fluoroalkyl radical from 1 to 3 carbon atoms, optionally containing one H or Cl atom;

X and Y are equal to —F or —CF$_3$; Z represents —CFX— or —(CF$_2$—CFY)—;

q and q', equal to or different from each other, are integers in the range 0–10;

the number average molecular weight of the monomer is in the range 200–2,000;

2) R$_F$—CH=CH$_2$ (VII)

wherein R$_F$ has the meaning described in 1);

3) a perfluorodioxole of formula:

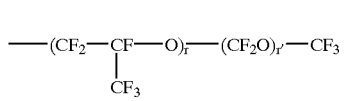

wherein R$_3$ is a C$_1$-C$_5$ perfluoroalkyl radical, preferably CF$_3$; X$_1$ and X$_2$ are, independently the one from the other, one fluorine atom or a perfluoroalkyl having from one to three carbon atoms, preferably a CF$_3$.

The preferred ratio by weight of the three classes of monomers which form the thermoplastic copolymers tetrafluoroethylene/perfluoromethylvinylether/fluorinated monomers (D) is the following:

perfluoromethylvinylether: 2–9%;

fluorinated monomers: 0.1–1.5%;

tetrafluoroethylene: complement to 100%.

Among the comonomers of formula (II) perfluoroethylvinylether, perfluoropropylvinylether and perfluorobutylvinylether can for example be mentioned. The preferred comonomer of this class is perfluoropropylvinylether.

The comonomers of formula (III) are described, for example, in the European patent application EP 75,312. Examples of these comonomers are those in which r can be 1 or 2 and r' is 2.

The comonomers of formula (IV) are obtained by dechlorination of the compounds of formula:

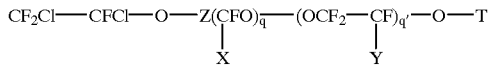

which can be prepared as described in Example 11 of U.S. Pat. No. 4,906,770.

In the comonomers of formula (VII) $R_F$—CH=CH$_2$, the radical $R_F$ preferably contains from 2 to 6 carbon atoms. Examples of these comonomers are perfluorobutylethylene and perfluorohexylethylene.

The above described fluorinated comonomers from (1) to (3) can be copolymerized with TFE and perfluoromethylvinylether alone to give terpolymers or in combination with each other to give tetrapolymers or copolymers having a more complex composition.

The tetrafluoroethylene copolymers can be prepared by radical polymerization in aqueous medium. Performing the polymerization in aqueous phase by using a dispersion or a microemulsion of perfluoropolyether according to European patent application No. 247,379, or, preferably, as described in U.S. Pat. No. 4,864,006 results particularly suitable.

The preferred TFE (co)polmers to be used for the preparation of the dispersion of the present invention are the TFE (PTFE) homopolymers or the TFE copolymers with perfluoromethylvinylether between 0.05 and 8% by moles, the latter are known as MFA perfluoropolymers.

The Melt Flow Index (MFI) is an usual indicator of the average molecular weight of the polymer. The MFI (ASTDM D1238-52T method) of the PTFE or its copolymers can generally range between 0.1 and 30. TFE (co)polymers having a molecular weight of about 1,000,000 are usable.

When the surfactant component c) of the composition of the invention is a fluorinated compound, it has preferably a (per)fluoropolyether or perfluoroalkyl structure with ionic or non ionic end groups and it can have the function of dispersant/surfactant or of antirust or antiwear additive. When it is a hydrogenated compound it is preferably a surfactant of non ionic type.

The fluorinated surfactants have for example a (per)fluoropolyether or perfluoroalkyl chain, both of ionic and non ionic type, selected from the following classes:

A') mono and dicarboxylic acids or salts thereof;

B') sulphonic acid salts;

C') phosphoric mono and diesters and mixtures thereof, as such or salified, optionally containing triesters in an amount lower than 15% by moles with respect to the total mixture;

D') non ionic surfactants formed by fluorinated chains and polyoxyalkylene chains having a number of repeating oxyalkylene units higher than 6;

E') cationic surfactants having one or more fluorinated hydrophobic chains.

It is also possible to use mixtures of the surfactants thereof, for example mixtures of carboxylic acids having a PFPE or perfluoroalkyl chain with the structure of class A') with non ionic surfactants belonging to class D').

The surfactants C') are described for example in EP 687,533 and EP 709,517, herein incorporated by reference. Among these surfactants the phosphoric monoesters and diesters of perfluoropolyethers can be mentioned.

The surfactants D') are described for example in EP 818,490, EP 818,489, EP 826,714 herein incorporated by reference.

Among the surfactants E'), for example described in U.S. Pat. No. 5,294,248, herein incorporatd by reference, tetralkylammonium or pyridinium salts having a PFPE chain can be mentioned.

Among the hydrogenated surfactants, ethoxylated alkylphenols, ethoxylated alcohols, alkylpolyglucosides, amine oxides can be mentioned.

The fluorinated low-boiling solvent component e) of the composition of the invention can have a (per)fluoropolyether or perfluorocarbon structure and it must have, as said, a boiling point in the range 60°–90° C., preferably 60°–80° C. at the pressure of 1 atm.

A process for preparing the dispersions of the invention to be used as lubricants for the indicated applications is the following.

A concentrated aqueous dispersion of (per)fluoropolymer (component b')) under the form of an aqueous latex at 40–75% by weight stabilized with non ionic surfactant for example Triton® X100, is mixed with a perfluoropolyether lubricant component a) and with a surfactant component c), optionally adding a fluorinated solvent, having a PFPE or perfluorocarbon structure, component e). When two phases form, the lower phase which contains the fluorinated lubricant and a part of the (per)fluoropolymer is recovered. When on the contrary only one phase forms, the mixture is used as such. The formation of a monophasic or biphasic system depends on the combination of the used lubricant and surfactant. A guide for obtaining these systems is indicated in the Examples described hereinafter.

The obtained dispersions result continuous in aqueous phase. This means that they are dilutable in water and allow to obtain by dilution a stable aqueous dispersion, macroscopically formed by a single liquid phase. This result is unexpected since the dispersions prepared by the gelification process according to the mentioned European patent application are all biphasic, i.e. they are formed by a fluorinated phase separated from an aqueous phase.

It has been found by the Applicant that the underlying oil phase obtained by the gelification process from aqueous latexes, neutralization, gel dispersion, are not dilutable in water and cannot therefore be used to prepare aqueous dispersions dilutable with water.

It is surprising that by adding water to the systems described in the present invention, fluorinated compounds rich (lubricant, (per)fluoropolymer and optionally fluorinated solvent), a stable dispersion is obtained from which water does not separate for the above indicated times. This is advantageous from the industrial point of view since it allows to have available stable aqueous dispersions of PFPE lubricants in the presence of a (per)fluoropolymer as thickener at the desired and required dilution by the application.

The compositions of the invention are applied to the parts to be lubricated by the conventional techniques, for example by spraying, by dipping of the parts to be lubricated into the dispersion.

The following Examples are given for illustrative purposes and they are not limitative of the scope of the invention.

EXAMPLE 1

0.8 g of a carboxylic acid having a perfluoropolyether (PFPE) structure, belonging to class A') and having average molecular weight 530 have been added to a mixture of 26.5 g of Fomblin Y04 oil having average molecular weight 1,500 and kinematic viscosity 38 cSt (3.8 $10^7$ m$^2$/s) at 20° C. and 5.3 g of Galden® SV90 fluorinated solvent b.p. 90° C. obtaining, after mixing, a limpid solution.

The solution has been mixed with 60 g of a commercial latex of PTFE Algoflon® D60 formed by particles having an average diameter equal to 0.25 micron, at a concentration of 60% by weight of dry product and containing an amount of Triton® X100 equal to 3% by weight, for obtaining an initial ratio by weight oil/PTFE=0.74 and carboxylic acid PFPE/PTFE=0.023.

After stirring, only one phase under the form of a dispersion of white colour is obtained, wherein the main components have the following composition (% by weight) determined by weight loss (gravimetric route) of a sample after heating at 110° C. for two hours to remove water and Galden® SV90 and subsequently at 400° C. for 10 minutes to remove Fomblin® Y04: PTFE=39.3%, Fomblin® Y04= 31.5%, Galden® SV90+water=29.2%.

The method allows to determine within an acceptable error, normally of 1–2%, the solvents and the PTFE. The surfactants are removed at the same temperature range used for removing the oils, therefore the oil percentage comprises the surfactants, which anyway are present in the composition in a reduced percentage.

After two months from the preparation the obtained dispersion results stable, without solid separation or coagulation.

Said dispersion can be diluted by addition of water up to a final concentration of the perfluorinated compounds PTFE+Fomblin® oil equal to 1% by weight.

EXAMPLE 2

Example 1 is repeated but using 2.4 g of the carboxylic acid PFPE, 92.4 g of Fomblin® Y04, 12.7 g of Galden® SV90, 100 g of commercial latex of PTFE Algoflon® D60 (ref. Example 1) in order to obtain an initial ratio by weight oil/PTFE=1.54 and of carboxylic acid PFPE/PTFE=0.04.

The obtained dispersion has th following composition in the main components, determined as in Example 1: PTFE= 29%, Fomblin® Y04=44.5%, Galden® SV90+water= 26.5%.

After two months from the preparation the dispersion is stable, without solid separation or coagulation.

Said dispersion can be diluted by addition of water up to a final concentrtion of the perfluorinated compounds PTFE+Fomblin® oil equal to 1% by weight.

EXAMPLE 3

Example 1 is repeated but using 0.5 g of the carboxylic acid PFPE, 54 g of Fomblin® Y04, 16.2 g of Galden® SV90, 60 g of commercial latex of PTFE Algoflon® D60 in order to obtain an initial ratio by weight oil/PTFE=1.5 and carboxylic acid PFPE/PTFE=0.015.

The obtained dispersion has the following composition in the main components, determined as in Example 1: PTFE= 28.49, Fomblin® Y04=42.3%, Galden® SV90+water= 29.3% (water 19% by weight, determined by Karl Fischer).

After two months from the preparation the dispersion is stable, without solid separation or coagulation.

Said dispersion can be diluted by addition of water up to a final concentration of the perfluorinated compounds PTFE+Fomblin® oil equal to 1% by weight.

EXAMPLE 4

Example 1 is repeated but using 0.8 g of the carboxylic acid PFPE, 90 g of Fomblin® Y04, 33.9 g of Galden® SV90, 60 g of commercial latex of PTFE Algoflon® D60 in order to obtain an initial ratio by weight oil/PTFE=2.5 and carboxylic acid PFPE/PTFE=0.023.

The obtained dispersion has the following composition in the main components, determined as in Example 1: PTFE= 18.7%, Fomblin® Y04=50.8%, Galden® SV90+water= 30.5% (water 13% by weight, determined by Karl Fischer).

After two months from the preparation the dispersion is stable, without solid separation or coagulation.

Said dispersion can be diluted by addition of water up to a final concentration of the perfluorinated compounds PTFE+Fomblin® oil equal to 1% by weight.

EXAMPLE 5

Example 1 is repeated but using 1.1 g of the carboxylic acid PFPE, 126 g of Fomblin® Y04, 37.8 g of Galden® SV90, 60 g of a commercial latex of PTFE Algoflon® D60 in order to obtain an initial ratio by weight oil/PTFE=3.5 and carboxylic acid PFPE/PTFE=0.03.

The obtained dispersion has the following composition in the main components, determined as in Example 1: PTFE= 14.5%, Fomblin® Y04=58%, Galden® SV90+water=27.5% (water 11.9% by weight, determined by Karl Fischer).

After two months from the preparation the dispersion is stable, without solid separation or coagulation.

Said dispersion can be diluted by addition of water up to a final concentration of the perfluorinated compounds PTFE+Fomblin® oil equal to 1% by weight.

EXAMPLE 6

Example 1 is repeated but using 2.52 g of an aqueous solution of an ammonium salt of the carboxylic acid PFPE, said solution having a content of dry product equal to 10% by weight, 105 g of Fomblin® Y04, 21 g of Galden® SV90, 70 g of commercial latex of PTFE Algoflon® D60 obtaining an initial ratio by weight oil/PTFE=2.5 and ammonium salt of the carboxylic acid PFPE/PTFE=0.06.

An emulsion is obtained.

After two hours at rest, the separation of two phases is obtained. The dispersion in the lower phase, oil-enriched, is recovered and it has the following composition in the main components, determined as in Example 1: PTFE 17.4%, Fomblin® Y04=56.5%, Galden® SV90+water=26.1%.

The ratio Fomblin® oil/PTFE in the recovered dispersion is 3.2.

After two months from the preparation the dispersion is stable, without solid separation or coagulation.

Said dispersion can be diluted by addition of water up to a final concentration of the perfluorinated compounds PTFE+Fomblin® oil equal to 1% by weight.

EXAMPLE 7

Example 6 is repeated but using 9.6 g of an aqueous solution of an ammonium salt of the carboxylic acid PFPE, said solution having a content of dry product equal to 10% by weight, 120 g of Fomblin® Y04, 9 g of Galden® SV90, 80 g of commercial latex of PTFE Algoflon® D60 in order to obtain an initial ratio by weight oil/PTFE=2.5 and ammonium salt of the carboxylic acid PFPE/PTFE=0.02.

An emulsion is obtained.

After two hours at rest, the separation of two phases is obtained. The dispersion in the lower phase, oil-enriched, is recovered and it has the following composition in the main components, determined as in Example 1: PTFE 13.7%, Fomblin® Y04=64.8%, Galden® SV90+water=21.5%. The ratio Fomblin® oil/PTFE in the separated dispersed phase is equal to 4.7.

After two months from the preparation the dispersion is stable, without solid separation or coagulation.

Said dispersion can be diluted by addition of water up to a final concentration of the perfluorinated compounds PTFE+Fomblin® oil equal to 1 by weight.

EXAMPLE 8

Example 1 is repeated but using 90 g of Fomblin® Y04, 33.8 g of Galden® SV90, 60 g of commercial latex of PTFE Algoflon® D60 and replacing the carboxylic acid PFPE surfactant with 3.24 g of a solution at 25% by weight of hydrogenated non ionic surfactant Triton® X100.

Initial ratio by weight oil/PTFE=2.5 and Triton®/PTFE=0.023.

After two hours at rest, the separation of two phases is obtained. The dispersion in the lower phase, oil-enriched, is recovered and it has the following composition in the main components, determined as in Example 1: PTFE 9.6%, Fomblin® Y04=56.9%, Galden® SV90+water=33.5%. The ratio Fomblin® oil/PTFE in the separated dispersed phase is equal to 5.9.

The dispersion is dilutable with water up to a final concentration of Fomblin® oil+PTFE equal to 1% by weight.

EXAMPLE 9

Example 8 is repeated using the same amounts of Fomblin' Y04, Galden® SV90 and commercial latex of PTFE Algoflon® D60, but replacing the Triton® X100 solution with 0.2 g of a hydro-alcoholic solution at 40% by weight of fluorinated non ionic surfactant Forafac® 1110D having formula $C_6F_{13}C_2H_4(CH_2CH_2O)_{11.5}OH$ belonging to class D').

Initial ratio by weight oil/PTFE=2.5 and Forafac®/PTFE=0.023.

After two hours at rest, the separation of two phases is obtained. The dispersion in the lower phase, oil-enriched, is recovered and it has the following composition in the main components, determined as in Example 1: PTFE 12.6%, Fomblin® Y04=53%, Galden® SV90+water=34.4%. The ratio Fomblin® oil/PTFE in the separated dispersed phase is equal to 4.2.

The dispersion is dilutable with water up to a final concentration of Fomblin® oil+PTFE equal to 1% by weight.

EXAMPLE 10

Example 8 is repeated using the same amounts of Fomblin® Y04, Galden® SV90 and commercial latex of PTFE Algoflon® D60, but replacing the Triton® X100 solution with 16.6 g of an aqueous solution at 4.8% by weight of ammonium salt of the perfluorooctanoic acid (PFOA) (Miteni®) belonging to class A').

Initial ratio by weight oil/PTFE=2.5 and PFOA/PTFE=0.023.

Only one dispersed phase of white colour is obtained having the following composition in the main components, determined as in Example 1: PTFE 19.3%, Fomblin® Y04=45%, Galden® SV90+water=35.7%.

The dispersion is dilutable with water up to a final concentration of Fomblin® oil+PTFE equal to 1% by weight.

EXAMPLE 11

By using the procedure described in Example 1, 0.81 g of Forafac® 1187 (sodium alkylsulphonate) belonging to class B') have been mixed with Fomblin® Y04 and Galden® SV90 using the same amounts of these components as reported in Example 8. The obtained emulsion is mixed with the same amount indicated in Example 8 of commercial latex of PTFE Algoflon® D60.

Initial ratio by weight oil/PTFE=2.5 and Forafac®/PTFE=0.023.

Only one dispersed phase of white colour is obtained having the following composition in the main components, determined as in Example 1: PTFE 19%, Fomblin® Y04=46.5%, Galden® SV90+water=34.5%.

The dispersion is dilutable with water upto a final concentration of Fomblin® oil+PTFE equal to 1% by weight.

EXAMPLE 12

According to the procedure described in Example 1, 0.48 g of carboxylic acid PFPE, 18.4 g of Fomblin® Y45 having average molecular weight 4,100 and viscosity of 470 cSt ($4.7 \times 10^8$ m²/s) at 20° C., 2.54 g of Galden® SV90 and 20 g of commercial latex of PTFE Algoflon® D60 are used.

Initial ratio by weight oil/PTFE=1.54 and carboxylic acid PFPE/PTFE=0.04.

Only one dispersed phase of white colour is obtained having the following composition in the main components, determined as in Example 1: PTFE 25.59, Fomblin® Y45=48.1%, Galden® SV90+water=26.4%.

EXAMPLE 13

Example 12 is repeated but using instead of Fomblin® Y45, Fomblin® YR having average molecular weight 6,250 and viscosity of 1,200 cSt ($1.2 \times 10^9$ m²/s) at 20° C. Initial ratio by weight oil/PTFE=1.54 and carboxylic acid PFPE/PTFE=0.04.

Only one dispersed phase of white colour is obtained having the following composition in the main components, determined as in Example 1: PTFE 25.6%, Fomblin® YR=49%, Galden® SV90+water=25.4%.

EXAMPLE 14

Example 12 is repeated but using instead of Fomblin® Y45, Fomblin® M03 having average molecular weight 4,000 and viscosity of 30 cSt ($3 \times 10^7$ m²/s) at 20° C. Initial ratio by weight oil/PTFE=1.54 and carboxylic acid PFPE/PTFE=0.04.

Only one dispersed phase of white colour is obtained having the following composition in the main components, determined as in Example 1: PTFE 27.7%, Fomblin® M03=45.4%, Galden® SV90+water=26.9%.

EXAMPLE 15

Example 12 is repeated but using instead of Fomblin® Y45, Fomblin® M60 having average molecular weight 12,500 and viscosity of 550 cSt ($5.5 \times 10^8$ m²/s) at 20° C. Initial ratio by weight oil/PTFE=1.54 and carboxylic acid PFPE/PTFE=0.04.

Only one dispersed phase of white colour is obtained having the following composition in the main components, determined as in Example 1: PTFE 29.6%, Fomblin® M60 44.4%, Galden® SV90+water=26%.

EXAMPLE 16

According to the procedure described in Example 1, 1.44 g of carboxylic acid PFPE, 90 g of Fomblin® Y04, 27 g of Galden® SV90 and 60 g of commercial latex of PTFE Algoflon® D60 are used.

Initial ratio by weight oil/PTFE=2.5 and carboxylic acid PFPE/PTFE=0.04.

Only one dispersed phase of white colour is obtained having the following composition in the main components, determined as in Example 1: PTFE 19.8%, Fomblin® Y04=54.7%, Galden® SV90+water=25.5%.

The dispersion, containing 74.5% by weight of lubricant (PTFE+Fomblin®), is diluted with water so as to have a total lubricant concentration of 20%. The dispersion stability during the time has then been evaluated by the following method. A portion of the obtained dispersion is poured into a 10 ml cylinder and one observes during the time if a supernatant layer is separated and therefore two phases form. After 12 hours no separation of phase is observed, after 24 hours a limpid supernatant layer corresponding to 2% by weight is separated. The initial dispersion is restored by stirring the two phases.

EXAMPLE 17

Example 1 is repeated but using 2.78 g of carboxylic acid PFPE, 90 g of Fomblin® Y04, 27 g of Galden® SV90, 60 g of commercial latex of PTFE Algoflon® D60 in order to obtain an initial ratio by weight oil/PTFE=2.5 and carboxylic acid PFPE/PTFE=0.075.

The obtained dispersion has the following composition in the main components, determined as in Example 1: PTFE= 19.3%, Fomblin® Y04=53.1%, Galden® SV90+water= 27.6%.

Said dispersion, containing an amount of lubricant equal to 72.4% by weight, has been diluted with water until decreasing the lubricant concentration to 20% by weight. On the so obtained dispersion the stability has been measured by the method described in Example 16. The results are equal to those of Examnple 16.

After 12 hours no separation of phase is observed, after 24 hours a limpid supernatant layer corresponding to 2% by weight is separated. The initial dispersion is restored by stirring the two phases.

EXAMPLE 18

An actuator mobile in two perpendicular directions, formed by three microgears connected with each other, manufactured in plastic material initially not lubricated and having a 5 mm diameter, moved by a micromotor, is subjected to a noise evaluation by phonometer, using as unit of measure the decibel (dB). The noise is determined when the inlet signal in the phonometer is stable.

At the end of the test the gears are disassembled and carefully cleaned with a very volatile solvent, for example Galden® HT55 and subsequently lubricated by dipping for about two minutes into a dispersion maintained under magnetic stirring and prepared according to Example 1 and diluted before the use with water to have a lubricant concentration (PTFE+PFPE) of 20% w/w.

The actuator has then been subjected to a noise evaluation according to the above indicated method.

The procedure is repeated with dispersions diluted with water and having the same final concentration of lubricant according to Examples from 2 to 5 using for each example new microgears.

The obtained results are reported in Table 1 and show that the lubricant is able to reduce the actuator noise.

EXAMPLE 19

A dispersion according to Example 1, diluted with water to a concentration of 20% by weight of lubricant PTFE+ Fomblin® oil, is spray-applied on No. 9 plates of hydrogenated rubber EPDM and respectively fluorinated rubber Tecnoflon®. The deposited lubricant amount is in the range 6–7 g/m².

The plates are dried in a stove at 60° C. for 8 hours in order to remove the solvent water+Galden® SV90.

Determinations of the friction coefficient according to ASTM D 1894 are carried out on the plates, but using a trolley with steel balls having a diameter of 12 mm.

The data are reported in Table 2 and show that by using the lubricant of the invention the friction coefficient is reduced of about two orders of magnitude with respect to that of the untreated surface. In the Table, in the first column on the left, the weight applied to the trolley is expressed in Newton.

EXAMPLE 20

Example 1 is repeated but using 0.83 g of carboxylic acid PFPE, 54 g of Fomblin® Y04, 16.2 g of Galden® SV90, 60 g of commercial latex of PTFE Algoflon® D60 in order to obtain an initial ratio by weight oil/PTFE=1.5 and carboxylic acid PFPE/PTFE=0.023.

The obtained dispersion has the following composition in the main components, determined as in Example 1: PTFE= 27.3%, Fomblin® Y04=40.5%, Galden® SV90+water= 32.2%.

The dispersion is diluted as in Example 19 and spray-applied on plates of hydrogenated rubber EPDM and respectively fluorinated rubber Tecnoflon®, and the same procedure is followed for determining the friction coefficient. The results are reported in Table 2 and show that by using the lubricant of the invention the friction coefficient is reduced of about two orders of magnitude.

EXAMPLE 21

A dispersion according to Example 4, diluted with water to a concentration of 20% by weight of lubricant PTFE+ Fomblin® oil, is spray-applied on plates of hydrogenated rubber EPDM and fluorinated rubber Tecnoflon®, respectively, and the same procedure described in Example 19 is followed for determining the friction coefficient. The results are reported in Table 2 and show that by using the lubricant of the invention the friction coefficient is reduced of about two orders of magnitude.

EXAMPLE 22 (COMPARATIVE)

Preparation of an aqueous dispersion according to Example 1 of EP 894,838, using the intermediate step in gel phase. Test of addition of water to the organic phase which is recovered after separation of the phases.

440 g of a dispersion at 20% by weight containing particles having an average diameter of 75 nm of a terpolymer formed by TFE-FMVE-FPVE in molar ratio 96.15-3.5-0.35 and prepared by the procedure described in Example 1 of EP 633,274, are transferred into a glass cylinder having 1 l capacity. The dispersion is acidified by adding 13.6 ml of concentrated nitric acid 6.8 M. About 400 ml of a gel phase at pH 1 are formed. The polymer content in the gel phase is 19.5% by weight.

To 50 g of gel, corresponding to 9.75 g of polymer, 0.718 g of a carboxylic acid having a PFPE structure and number average molecular weight 530, are added. By stirring the redispersion of the polymer in water is obtained. To this dispersion 39 g of Galden® SV90 are added so as to have a ratio by weight polymer/fluorinated liquid of 0.25.

By slowly stirring the almost quantitative transfer (higher than 99%) of the polymer in the fluorinated solvent, is obtained. The organic phase, obtained after separation from the aqueous phase, contains 19.4% by weight of polymer and 1.3% by weight of water.

By adding water to the fluorinated phase, the formation of two phases is observed.

The fluorinated phase is dilutable only with Galden® SV90.

EXAMPLE 23 (COMPARATIVE)

Example 19 has been repeated applying on fluorinated rubber Tecnoflon® a composition prepared according to Example 16 of EP 894,830, containing a larger amount of optional low-boiling solvent component e).

Said composition has been prepared by adding 0.98 g of a carboxylic acid having a PFPE chain and structure

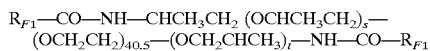

$R_{F1}$—CO—NH—CHCH$_3$CH$_2$ (OCHCH$_3$CH$_2$)$_s$— (OCH$_2$CH$_2$)$_{40.5}$—(OCH$_2$CHCH$_3$)$_t$—NH—CO—$R_{F1}$ wherein s+t=2.5 and $R_{F1}$ having average molecular weight 426 has the structure

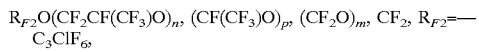

$R_{F2}$O(CF$_2$CF(CF$_3$)O)$_n$, (CF(CF$_3$)O)$_p$, (CF$_2$O)$_m$, CF$_2$, $R_{F2}$=—C$_3$ClF$_6$, to 97 g of a mixture formed for 92.8% by weight by Galden® SV90 and for 7.2% by weight of Fomblin® Y04 oil having a number average molecular weight 1,500 and viscosity of 38 cSt at 20° C. The obtained limpid solution has been mixed under mild stirring with 89 g of the latex of PTFE Algoflon® D60 PS) concentrated at 60% by weight, in order to have a weight ratio polymer/oil of 0.55. A white dispersion which quickly separates at the end of the stirring, is obtained.

After having separated the aqueous supernatant phase, that rich in the mixture of perfluoropolyether oils has been used for the test.

The results are reported in Table 2 and show that the composition obtained according to this Example of the prior art is less effective as lubricant than the compositions of the invention, since the friction coefficient is higher.

EXAMPLE 24 (COMPARATIVE)

Example 19 has been repeated applying on fluorinated rubber Tecnoflon® a composition prepared according to Example 17 of EP 894,830, containing a larger amount of optional low-boiling solvent component e).

The composition has been prepared as reported in the previous Example 23, except that the amount by weight of Galden® SV90 in the mixture with Fomblin is 80% (Fomblin=20% by weight) and the used Fomblin is Fomblin® Y45 having number average molecular weight 4,100 and viscosity of 470 cSt at 20° C.

The results are reported in Table 2 and show that the composition obtained according to this Example of the prior art is less effective as lubricant than the compositions of the invention, since the friction coefficient is higher.

EXAMPLE 25 (COMPARATIVE)

Example 19 has been repeated applying on fluorinated rubber Tecnoflon® a concentrated latex Algoflon® D60.

The results are reported in Table 2 and show that the composition obtained according to this Example of the prior art is less effective as lubricant than the compositions of the invention, since the friction coefficient is higher.

EXAMPLE 26 (COMPARATIVE)

Tests for determining the friction coefficient on fluorinated resin Tecnoflon® of a dispersion in fluorinated solvent.

A dispersion in solvent is prepared having the following composition by weight: Fomblin® Y04 43.5%, PTFE® L206 16.5%, Galden® SV90 40%. The dispersion is diluted with Galden® SV90 to 20% by weight of Fomblin® Y04+ PTFE.

By using the method described in Example 19 the friction coefficient is determined by spray-applying to the plates covered with Tecnoflon® the dispersion in fluorinated solvent. The obtained results are reported in Table 2 and show that the system in solvent is less effective in reducing the friction coefficient, the conditions being equal, than the aqueous dispersions of the invention.

TABLE 1

Evaluation of the noise (in decibel) of an actuator formed by three microgears and a micromotor, lubricated with the diluted dispersions of the invention according to the Examples mentioned below, having a concentration of 20% by weight of lubricant (PTFE + Fomblin ® oil)

| Diluted dispersions | Noise (decibel) | Noise reduction with respect to the control (%) |
|---|---|---|
| control (actuator without lubricant) | 66 | 0 |
| Ex. 1 | 64.3 | 2.6 |
| Ex. 2 | 61.6 | 6.7 |
| Ex. 3 | 63 | 4.5 |
| Ex. 4 | 60.8 | 7.9 |
| Ex. 5 | 64.5 | 2.3 |

TABLE 2

Evaluation of the friction coefficient on EPDM rubber and fluorinated resin Tecnoflon ® using the diluted dispersion of Ex. 19, 20 and 21 having a concentration of 20% by weight of PTFE + Fomblin ® oil.

| Ex. | Weight applied to the trolley (Newton) | EPDM untreated | EPDM treated | Tecnoflon ® untreated | Tecnoflon ® treated |
|---|---|---|---|---|---|
| 19 | 2.11 | 1.4 | 0.06 | 1 | 0.1 |
|  | 7.03 | 1.15 | 0.06 | 0.83 | 0.06 |
|  | 11.9 | 1 | 0.06 | 0.77 | 0.06 |
| 20 | 2.11 | 1.4 | 0.07 | 1 | 0.06 |
|  | 7.03 | 1.15 | 0.06 | 0.83 | 0.05 |
|  | 11.9 | 1 | 0.06 | 0.77 | 0.05 |
| 21 | 2.11 | 1.4 | 0.07 | 1 | 0.07 |
|  | 7.03 | 1.15 | 0.06 | 0.83 | 0.06 |
|  | 11.9 | 1 | 0.07 | 0.77 | 0.06 |
| 23 comp. | 2.11 | — | — | 1 | 0.44 |
|  | 7.03 | — | — | 0.83 | 0.31 |
|  | 11.9 | — | — | 0.77 | 0.27 |
| 24 comp. | 2.11 | — | — | 1 | 0.57 |
|  | 7.03 | — | — | 0.83 | 0.42 |
|  | 11.9 | — | — | 0.77 | 0.35 |
| 25 comp. | 2.11 | — | — | 1 | 0.59 |
|  | 7.03 | — | — | 0.83 | 0.4 |
|  | 11.9 | — | — | 0.77 | 0.35 |
| 26 comp. | 2.11 | — | — | 1 | 0.33 |
|  | 7.03 | — | — | 0.83 | 0.28 |
|  | 11.9 | — | — | 0.77 | 0.26 |

What is claimed is:

1. A method for obtaining a low friction coefficient and an improved reduction of the noise among moving mechanical parts, comprising applying to said parts a lubricant composition in the form of dispersions comprising a fluorinated oil, a perfluoropolymer and water, wherein said dispersions are characterized in that they are dilutable with water even up to a concentration of 1% by weight of fluorinated oil+(per) fluoropolymer and in that they are obtained by mixing:
   a) a fluorinated oil having a (per)fluoropolyether structure and lubricant capability, having a number of average molecular weight higher than 1,300,
   b) a concentrated aqueous dispersion of a (per) fluoropolymer (component b'), stabilized by a non ionic and non fluorinated surfactant, wherein the (per)fluoropolymer concentration is in the range 40–75%, c) a fluorinated and/or hydrogenated surfactant, d) water, e) optionally a fluorinated solvent having no lubricant properties, low boiling and having a number average molecular weight lower than 1,000, and eliminating the aqueous supernatant layer if after mixing step if the system separates in two phases.

2. Use according to claim 1, wherein the ratio by weight lubricant oil component a)/(per)fluoropolymer component b') is in the range 0.5–8.

3. The method according to claim 1, wherein the dispersions comprise the amounts of the following components as percentage by weight:

a) (per)fluoropolyether oil: 25–70%, b') (per)fluoropolymer: 5–40%, c) fluorinated and/or non fluorinated surfactant: 0.01–5% by weight, d) water: complement to 100% but not lower than about 10%, e) optionally a solvent having a (per)fluoropolyether or (per)fluorocarbon structure: 0–30%, the ratio oil/(per)fluoropolymer being that above indicated.

4. The method according to claim 1, wherein the dispersions are diluted with water so that the water amount is higher than 30% by weight.

5. The method according to claim 1, wherein the number average molecular weight of the (per)fluoropolyether lubricant is in the range 1,300–40,000.

6. The method according to claim 1, wherein the (per)fluoropolyether lubricant comprises fluorooxyalkylene units, said units being statically distributed along the polymer chain.

7. The method according to claim 6, wherein the (per)fluoropolyethers have (per)fluoroalkyl end groups and are selected from the following classes:

($a_1$) $T_1$—O($CF_2$—CF($CF_3$)O)$_a$(CFXO)$_b$—$T_2$ wherein:

$T_1$ and $T_2$, equal to or different from each other, can be —$CF_3$, —$C_2F_5$, —$C_3F_7$ groups, X is —F or —$CF_3$; a, b are numbers such that the molecular weight is within the above indicated range;

($b_1$) $CF_3$—O($CF_2CF_2O$)$_c$($CF_2O$)$_d$—$CF_3$ wherein:

c, d are integers such that the molecular weight is within the above indicated range;

($c_1$) $C_3F_7$—O(CF($CF_3$)—$CF_2O$)$_e$—$T_3$ wherein:

$T_3$ can be —$C_2F_5$, —$C_3F_7$; e is an integer such that the molecular weight is within the above indicated range;

($d_1$) $T_4$—O($CF_2$—CF($CF_3$)O)$_g$($C_2F_4O$)$_h$(CFXO)$_i$—$T_5$ wherein:

$T_4$ and $T_5$, equal to or different from each other, are perfluorinated groups —$CF_3$, —$C_2F_5$, —$C_3F_7$; X is —F or —$CF_3$; g, h, i, are integers such that the molecular weight is within the above indicated range;

($e_1$) $T_6$—O($CF_2CF_2CF_2O$)$_1$—$T_7$ wherein:

$T_6$ and $T_7$, equal to or different from each other, are —$CF_3$, —$C_2F_5$, —$C_3F_7$ groups; 1 is an integer such that the molecular weight is within the above indicated range.

8. The method according to claim 7, wherein the perfluoropolyethers are those of the classes ($a_1$), ($b_1$) and ($d_1$).

9. The method according to claim 1, wherein the end groups of the (per)fluoropolyethers are of perfluorinated type, optionally containing one chlorine and/or H atom.

10. The method according to claim 1, wherein the (per)fluoropolymer component b') is under the form of concentrated latex stabilized by a non ionic surfactant.

11. The method according to claim 10, wherein the latex concentration is [preferably] in the range 50–75% by weight.

12. The method according to claim 1, wherein the (per)fluoropolymers are the TFE homopolymers or the tetrafluoroethylene copolymers.

13. The method according to claim 12, wherein the tetrafluoroethylene copolymers are the following:

A) modified polytetrafluoroethylene containing in the range 0.01–3% by moles, of one or more comonomers selected from perfluoroalkylperfluorovinylethers; vinylidene fluoride; hexafluoroisobutene; chlorotrifluoroethylene; perfluoroalkylethylenes;

B) thermoplastic copolymers of tetrafluoroethylene (TFE) containing from 0.5 to 8% by moles of at least one perfluoroalkylvinylether, wherein the perfluoroalkyl radical has from 1 to 6 carbon atoms;

C) thermoplastic copolymers of tetrafluoroethylene containing from 2 to 20% by moles of a $C_3$–$C_8$ perfluoroolefin, to which lower than 5% by moles of other comonomers having a perfluorovinyl ether structure can be added;

D) thermoplastic copolymers of tetrafluoroethylene containing from 0.5 to 13% by weight of perfluoromethylvinylether and from 0.05 to 5% by weight of one or more fluorinated monomers selected from the group consisting of:

1) $R_FO$—CF=$CF_2$ (II)

wherein $R_F$ can be:

i) a perfluoroalkyl radical containing from 2 to 12 carbon atoms;

ii)

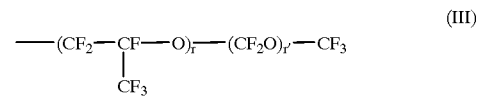

(III)

wherein r is an integer in the range 1–4 and r' is an integer in the range 0–3;

iii)

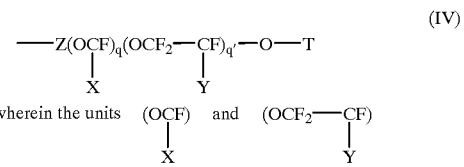

(IV)

are statistically distributed along the chain; T is a (per)fluoroalkyl radical from 1 to 3 carbon atoms, optionally containing one H or Cl atom; X and Y are equal to —F or —$CF_3$; Z represents —(CFX)— or —($CF_2$—CFY)—;

q and q', equal to or different from each other, are integers in the range 0–10; the number average molecular weight of the monomer is in the range 200–2,000;

2) $R_F$—CH=CH$_2$ (VII)

wherein $R_F$ has the meaning described in 1);

3) a perfluorodioxole of formula:

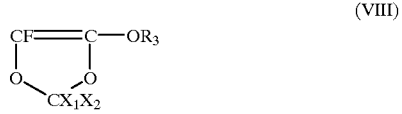
(VIII)

wherein $R_3$ is a $C_1$–$C_5$ perfluoroalkyl radical; $X_1$ and $X_2$ are, independently the one from the other, one fluorine atom or a perfluoroalkyl having from one to three carbon atoms.

14. The method according to claim 13, wherein the TFE (co)polymers are the TFE (PTFE) homopolymers or the TFE copolymers with perfluoromethylvinylether between 0.05 and 8% by moles.

15. The method according to claim 12, wherein the Melt Flow Index (ASTDM D1238-52T method) of the PTFE or its copolymers is in the range 0.1–30.

16. The method according to claim 1, wherein the surfactant component c) is a fluorinated compound and has a (per)fluoropolyether or perfluoroalkyl structure with ionic or non ionic end groups.

17. The method according to claim 16, wherein the fluorinated surfactants are selected from the following classes:
A') mono and dicarboxylic acids or salts thereof;
B') sulphonic acid salts;
C') phosphoric mono and diesters and mixtures thereof, as such or salified, optionally containing also triesters in an amount lower than 15% by moles with respect to the total mixture;
D') non ionic surfactants formed by fluorinated chains and polyoxyalkylene chains having a number of repeating oxyalkylene units higher than 6;
E') cationic surfactants having one or more fluorinated hydrophobic chains.

18. The method according to claim 1, wherein the fluorinated low-boiling solvent component e) has a (per)fluoropolyether or perfluorocarbon structure and boiling point in the range 60 °–90° C. at the pressure of 1 atm.

19. The method according to claim 1, wherein the dispersions are used for the lubrication of miniaturized gears, both in plastic material and metal, for the lubrication of flat surfaces both of plastomer and metal material, and of surfaces of plastic material in contact with painted surfaces, for the lubrication of seal gasket and of moulds for moulding plastomer and elastomer materials, for the lubrication of hinges in plastic or metal material.

20. Dispersions according to claim 3.

21. The method according to claim 3, wherein for the d) water: complement is in the range of 10 –30%.

22. The method according to claim 4, wherein the dispersions are diluted with water so that the water amount is higher than or equal to 40%.

23. The method according to claim 22, wherein the dispersions are diluted with water so that the water amount is higher than or equal to 50–60% by weight.

24. The method according to claim 13, wherein the A) modified polytetrafluoroethylene contain small amounts, in the range 0.05–0.5% by moles, of the one or more comonomers.

25. The method according to claim 13, wherein in the 3) perfluorodioxole of formula:

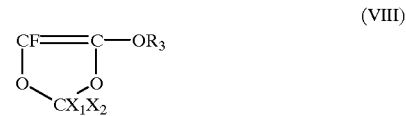
(VIII)

$R_3$ is $CF_3$.

26. The method according to claim 13, wherein in the 3) perfluorodioxole of formula:

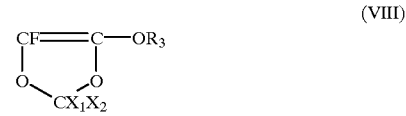
(VIII)

$X_1$ and $X_2$ are, independently the one from the other, one fluorine atom or $CF_3$.

27. The method according to claim 18, wherein the fluorinated low-boiling solvent component e) has a (per)fluoropolyether or perfluorocarbon structure and boiling point in the range 60°–80° C. at a pressure of 1 atm.

28. The method according to claim 6, wherein the fluorooxyalkylene units are selected from the following: $(CF_2CF_2O)$, $(CF_2O)$, $(CF_2CF(CF_3)O)$, $(CF(CF_3)O)$, $(CF_2CF_2CF_2O)$.

* * * * *